United States Patent [19]
Szendroi et al.
[11] Patent Number: 4,687,175
[45] Date of Patent: Aug. 18, 1987

[54] ATTACHING DEVICE

[75] Inventors: Balint Szendroi, Vallingby; Magnus Eriksson, Johanneshov, both of Sweden

[73] Assignee: Flygt AB, Solna, Sweden

[21] Appl. No.: 859,941

[22] Filed: May 5, 1986

[30] Foreign Application Priority Data

May 14, 1985 [SE] Sweden ............................... 8502389

[51] Int. Cl.[4] ............................................ F16M 13/00
[52] U.S. Cl. ................................ 248/661; 248/188.9; 248/267; 248/357
[58] Field of Search ............... 248/662, 677, 502, 357, 248/188.8, 188.9, 278, 207, 674, 661

[56] References Cited

U.S. PATENT DOCUMENTS

| | | | |
|---|---|---|---|
| 2,184,583 | 12/1939 | Danko | 248/278 |
| 3,289,997 | 12/1966 | Beulker et al. | 248/357 |
| 4,474,354 | 10/1984 | Field | 248/311.2 X |

FOREIGN PATENT DOCUMENTS

| | | | |
|---|---|---|---|
| 3013604 | 10/1980 | Fed. Rep. of Germany | 248/188.8 |
| 1219342 | 12/1959 | France | 248/357 |

*Primary Examiner*—J. Franklin Foss
*Assistant Examiner*—David L. Talbott
*Attorney, Agent, or Firm*—Menotti J. Lombardi

[57] ABSTRACT

An attaching device for mounting guide means in a liquid holding tank, the guide means being arranged to guide a submersible mixer into and out of the tank. The attaching device includes mutually pivoted parts which make possible securing of the device on horizontal, vertical as well as sloping surfaces.

3 Claims, 1 Drawing Figure

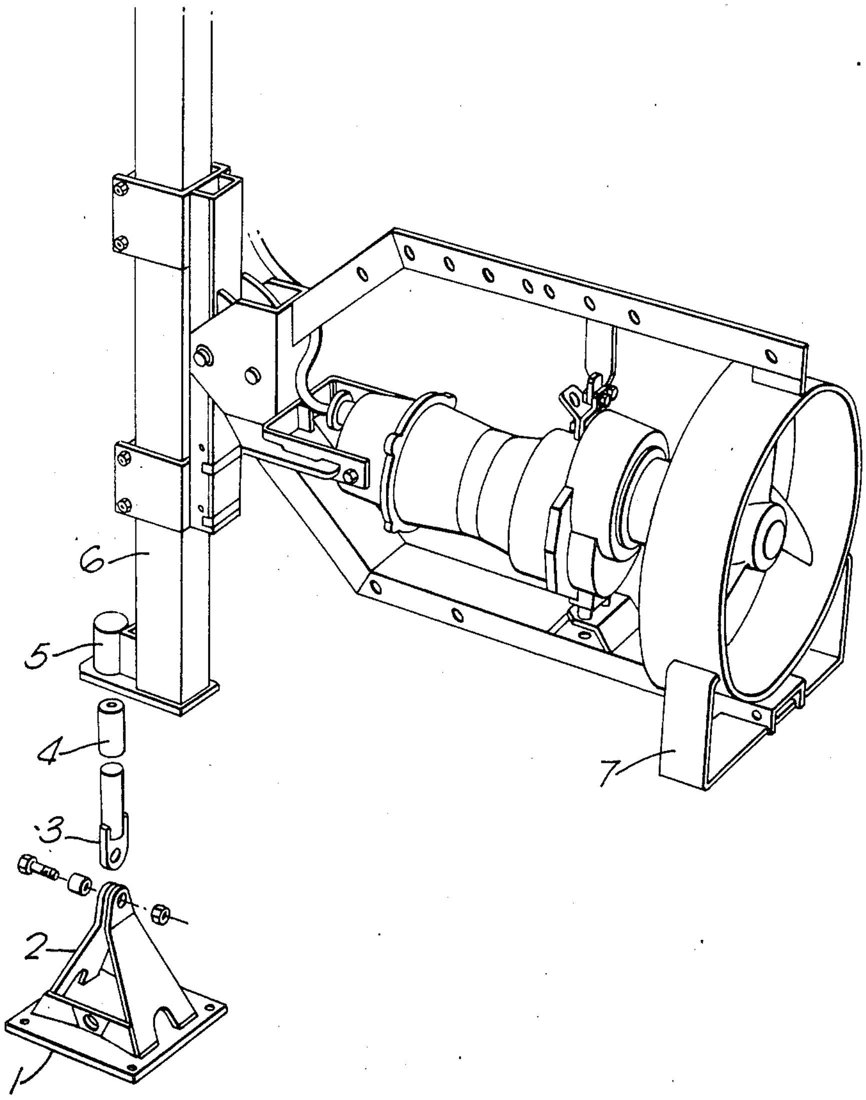
6
5
4
3
2
1
7

ATTACHING DEVICE

BACKGROUND OF THE INVENTION

The invention concerns a device for attaching an essentially vertical guide for a submersible mixer in a liquid tank.

Mixers are often used in tanks for holding liquids containing amounts of solid bodies to prevent sedimentation and to keep the liquid homogeneous. A type of mixer often used today is a submersible machine comprising an electric motor which may be provided with a gearbox, and an impeller. The machine is then normally arranged to be lowered along a vertical guide which is attached within the tank in a suitable way. One way of attaching the guide in the tank is by mounting one end of the guide for pivotal movement near the opening in the tank. This is described in co-pending application of Hjalmar Fries-Roland Narholm Bengt Thomaeus, Ser. No. 847,809, filed Apr. 3, 1986, entitled "A Method and a Device for Installation of a Mixer". The advantage of a submersible machine/vertical guide arrangement is, above all, that the mixer may be easily raised for service and in addition is very easy to adjust in various directions.

The central and important part in the plant is, in addition to the mixer itself, the guide used to lower the machine down to its operating position. The guide must be easy to attach in tanks already in use. It is also important that the attaching devices are not obstacles when the machine is moved along the guide. The attaching devices must also be suitable for attaching to horizontal, vertical as well as sloping surfaces. In order to provide an inexpensive solution, the same type of device should be used for all types of surfaces. Finally, the attaching means must be so designed that the guide can be rotated in both directions. This rotation is necessary to make possible various directions of the mixer, and the guide must also be turned when the mixer is lifted and taken away from the tank.

SUMMARY OF THE INVENTION

These objects and others which will become apparent hereinafter are accomplished by the present invention which provides a device for attaching a vertical guide for a submersible mixer in a liquid containing tank including a plate which is mounted on an inner surface of the tank and means which are attached to the plate and the guide for pivotal movement of the guide.

BRIEF DESCRIPTION OF THE DRAWING

The above-mentioned and other features and objects of this invention will become more apparent by reference to the following description taken in conjunction with the accompanying sole drawing which is an exploded view of the attaching device of this invention and includes one arrangement of the attaching device and mixer.

DETAILED DESCRIPTION OF THE PREFERRED EMBODIMENT

In the drawing an attaching plate 1 has fastening lugs 2, an intermediate part 3, a sleeve 4, a socket 5, a part of a guide 6 and a mixer 7.

The intermediate part 3 is pivotally attached to the lugs 2 by any suitable means. A bolt and nut arrangement is illustrated. The intermediate part 3 is directed in a suitable angle depending on the inclination of the plane of the tank surface to which the plate 1 is attached. The intermediate part 3 includes a rod and a member joining the rod with the lugs 2.

It is thus possible to affix the attaching plate 1 to a horizontal surface such as the bottom of the tank, a vertical surface such as the tank wall or a sloping surface such as a transition between the bottom and the wall.

The sleeve 4 may be made of a plastic material and has one end positioned on the intermediate part 3 about which it freely rotates. The other end of the sleeve 4 is pressed into the socket 5.

The socket 5 is in its turn rotatably carried by the intermediate part 3, thus making possible a rotation of the guide 6 with the socket 5 and the intermediate part 3 as the center of rotation. The guide 6 and the socket 5 are shown in the drawing as being attached to a plate, although any other suitable arrangement may be employed.

The attaching device is thus capable of being used on all surfaces, independent of their inclinations, without being changed. In addition, a rotation of the guide 6 is possible where the center of rotation is situated beside the guide. In addition, the attaching devices are so designed that they form no obstacles when the mixer is moved along the guide on its glides. This is very important in deep tanks since the guide must be attached at several points on the tank wall.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. An attachment device for mounting a guide element within a tank, said guide element for accepting along a longitudinal axis thereof a submersible mixer for maintaining liquids in said tank in a homogeneous condition; said attachment device comprising:

a substantially flat plate;

guide mounting means attached to the guide element, said guide mounting means being configured to be rotatably engaged about an axis of rotation parallel to said longitudinal axis of said guide element; and support means mounted on said flat plate, said support means including first and second means, said first means for rotatably engaging said guide mounting means and allowing free rotation of said guide mounting means about said axis of rotation, said second means being configured to fully support said guide element and submersible mixer on said flat plate and permitting said flat plate to pivot with respect to said longitudinal axis to enable attachment of said flat plate to vertical, horizontal and sloping surfaces of a tank while said guide element means is disposed in a preferred orientation of said longitudinal axis and said submersible mixer is fully supported and unencumbered with respect to displacement along said longitudinal axis.

2. The device according to claim 1 wherein said first means includes a sleeve press fit to said guide mounting means, said second means includes lug means fixedly mounted to said flat plate, said lug means being formed in a load bearing configuration to pivotably accept a tongue like member, said support means additionally comprising an intermediate member having a tongue like portion for acceptance by said lug means and a rod like portion for engaging said sleeve.

3. The device according to claim 1 wherein said axis of rotation and said longitudinal axis are displaced.

* * * * *